May 26, 1936. E. G. HOWLAND ET AL 2,041,835
PLASTIC PACKING COMPOSITION
Filed April 27, 1935
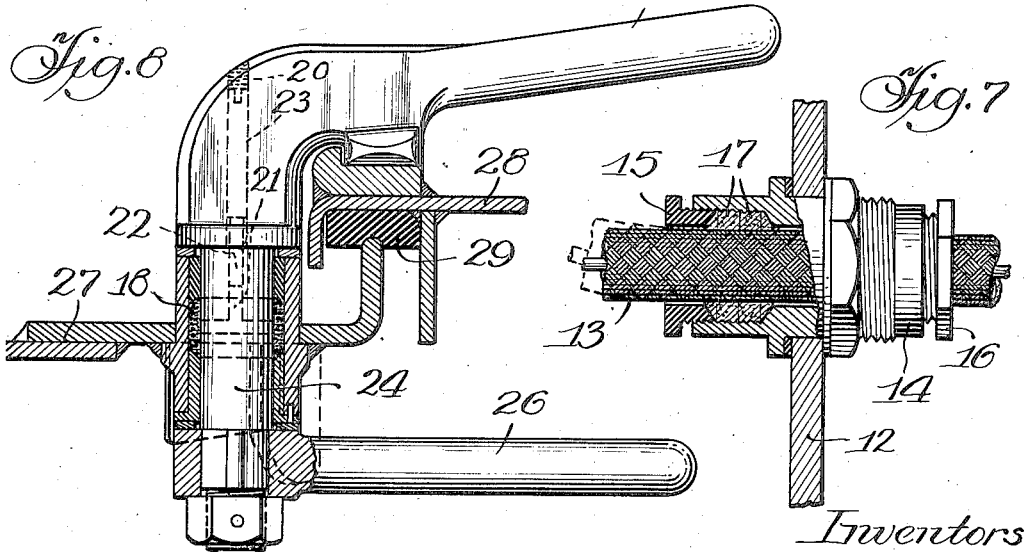
Inventors
Edgar G. Howland,
and Frank E. Payne
Dyrenforth, Lee, Chritton & Wiles, Attys.
Witness:
Chas. R. Foursh.

Patented May 26, 1936

2,041,835

UNITED STATES PATENT OFFICE 2,041,835

PLASTIC PACKING COMPOSITION

Edgar G. Howland, Park Ridge, and Frank E. Payne, Glencoe, Ill., assignors to Crane Packing Company, a corporation of Illinois Application April 27, 1935, Serial No. 18,594

6 Claims. (Cl. 106—8)

Our invention relates to improvements in packing for preventing leakage of air, water, steam, gas, oil and other liquids or gases, including poison gases used in warfare.

The possibility of gas attacks against naval vessels and other vessels by an enemy air fleet or some other agency, has introduced new problems in the design and construction of ships, both naval and merchant.

Merchant vessels, navy vessels, submarine and other craft are constructed with many compartments and are provided with a great deal of electrical equipment, resulting in many electrical conductors or insulated wires, or cables with woven or braided jackets, which necessarily have to pass through the various compartment walls. The openings through which they pass are provided with stuffing boxes, as it is very important to provide a tight joint, since the compartments themselves are expected to be water tight and in many cases must be air tight also. The compartment walls are also relied on to prevent the spread of escaping gas or fumes. Also, in case of a gas attack on an aeroplane carrier, battleship or destroyer, there must be complete assurance that the compartments in which the men are confined shall have fresh air circulating in the same and that poisonous gases will not penetrate.

Heretofore the packing used in the stuffing boxes, provided at the openings in the compartment, has been flax or similar fibrous material which has a certain amount of tallow in it. Movement of the cables or other insulated conductors near the point where they pass through these stuffing boxes tends to break the seal. Even the slight bending back and forth occasioned by the vibration to which said conductors are subjected almost continually, will break the seal and cause the insulation surrounding the conductors to show a certain amount of wear after a sufficient interval of time. Furthermore, the atmosphere in some of the compartments is hot, aside from the possibility of the heat developed in the case of fire breaking out, with the result in either case that the tallow or waxy material in the flax melts and some of it escapes, increasing the leakage of air or gas through the partition, or even water, in case some of the compartments become flooded as the result of a collision or other accident.

One object of the present invention is to provide a special packing to overcome these difficulties in a cable joint for a compartment wall, so that the joint will remain tight under the various conditions which arise in service, i. e. the detrimental normal conditions of vibration and heat, as well as the emergency conditions arising in the case of a poison gas attack, or a collision when some of the compartments are torn open, or become flooded for other reasons.

Another object is to provide an improved, readily deformable packing, composed of particles of various materials, such as cork, wood or other relatively light, non-conducting and preferably somewhat compressible or resilient particles, together with a binder of a very plastic, non-hardening grease having non-conducting characteristics and capable of withstanding fairly high temperatures, and under many conditions mixed with graphite and other lubricant. The ingredients are preferably confined in a jacket of fabric, metal or other material which holds the packing together sufficiently to enable it to be conveniently shipped and installed in a stuffing box, but which forms a sufficiently weak covering so that it may be easily disrupted by pressure, to render the anti-friction material more readily available for its intended purpose.

An additional object is to provide a packing of this character in which the high melting point grease is a dehydrated "fire kettle" grease, consisting essentially of a soda soap (principally sodium stearate) and high flash, straight mineral oil, having a melting point of about 350° F. or over.

A further object is to provide a packing which, when compressed around an insulated conductor, will interlock with the uneven surface of the covering and penetrate and seal the interstices so as to prevent leakage, even though the conductors are vibrated or moved to a greater or less extent.

An additional object is to provide a granular packing having the advantages enumerated and composed of ingredients which may conveniently be installed in any stuffing box in a braided or wrapped container, which, while tight enough to hold the granular packing material in a form convenient for handling, is, nevertheless, sufficiently open and lacking in strength to permit the packing to work through or extrude from the jacket when subjected to pressure in the stuffing box or which jacket will be disrupted or deformed by such pressure, to render the granular packing effective in packing around rods or conductors and preventing leakage past the same.

In addition to sealing cable stuffing boxes against leakage, it is important to prevent leakage through the doors in the bulkheads of vessels, when said doors are closed. Gaskets are used around the door openings, but the particular problem under consideration herein is the providing of a gas proof joint around the short shafts or spindles which pass through the doors and which serve, when turned by the handles at the ends, to lock the doors with a wedging action, such door locks being known as sea door dogs.

Where the packing is applied to the spindles of sea door dogs, it is preferable to omit graphite from said packing in view of the special steel with which said packing comes in contact. A suitable form of packing for sea door dogs consists of lead base metal granules, i. e. granules of lead or lead alloy, together with resilient cork granules, mixed with an aluminum stearate base grease of high melting point, together with mica or other inert filler.

An additional object of the invention, therefore, is to provide a packing suitable for the spindles of the bulkhead doors of vessels.

Other objects and advantages will be apparent from the following description of several embodiments of the invention.

In the drawing:

Fig. 1 is an elevation of a short length of packing;

Fig. 2 is an end view thereof;

Fig. 3 is an elevation of a modified form of packing;

Fig. 4 is an end elevation thereof;

Fig. 5 is an elevation of a further modified form of packing;

Fig. 6 is an additional modification;

Fig. 7 is a section through a compartment wall and through the stuffing box mounted thereon; and Fig. 8 is a section of a compartment door locking mechanism.

The packing in the form shown in Figs. 1 and 2 consists essentially of resilient, non-metallic material such as granulated or shredded cork, amorphous or flake graphite, high melting point dehydrated grease containing a soap content in excess of 30%, and heavy mineral oil. These ingredients 10 are extruded into a braided fibrous jacket 11, preferably of fibrous material such as linen.

Where the packing is to be used on cable stuffing boxes, on battleships, naval destroyers and other vessels it must give unusual service. For example, the cable joint must be tight against 150 pounds per inch air pressure, a similar water pressure and gas pressure, and must stand a temperature of 212° F. The joint must also withstand the wearing of the cables and fulfill these requirements for about twenty years without requiring adjustment as indicated by an aging test. It is frequently the practice to pass large groups of cables through a steel bulkhead, each cable passing through an individual hole drilled in the bulkhead. These holes are drilled fairly close together and when each is equipped with a stuffing box such as shown in Fig. 7, all of said stuffing boxes except the outer ones are inaccessible for tightening, and therefore the original compression must suffice for many years, as stated. There are sometimes as many as thirty cables passing through as many openings, these openings being closely positioned in a circular group with all except the outer row of stuffing boxes inaccessible for the application of a wrench.

The following formula has been found suitable for a packing to meet the above mentioned requirements:

| | |
|---|---|
| 8–12 mesh granulated cork | 8 lbs. 0 oz. |
| 14–20 mesh shredded cork | 3 lbs. 0 oz. |
| Amorphous graphite | 16 lbs. 0 oz. |
| High melting point dehydrated grease | 16 lbs. 0 oz. |
| Heavy mineral oil | 2 lbs. 8 oz. |

Granulated cork has irregular polygonal grains of which all the dimensions are nearly equal, whereas shredded cork has the form of somewhat elongated particles. The shredded variety is used largely in gaskets and the like, having a tendency to mat together better than the granulated cork. In the present instance, either form may be used although the above mentioned combination of both forms is preferred. The proportions, of course, may be varied. Also, flake graphite may be used instead of amorphous graphite. The proportions of all the ingredients may be varied, those given representing the preferred formula.

In compounding the product, the comminuted cork and the graphite are placed in a suitable mixer equipped with a revolving blade, paddle or other suitable mechanism, and the grease and oil previously broken down and thinned to the consistency of cream with benzol, naphtha, petroleum distillate and/or other suitable solvent or thinner is added thereto, mixing meanwhile. After thorough mixing of the ingredients, the solvent which is added as a means of facilitating the introduction of the grease into the product, is removed. This is accomplished preferably in the same mixer by one or more of the following means:

Steam is admitted to a steam jacket surrounding the mixer, the heat therefrom causing the vaporization and removal of the solvent through appropriate hood and ducts provided for the purpose. This volatilization may be accelerated by blowing air into the mixer, thus giving a more rapid change of air. Or the mixer may be connected to a vacuum pump thus converting the mixer in effect into a vacuum drier. By the incorporation of suitable solvent recovery apparatus the volatilized solvent may be condensed and recovered for reuse.

When substantially all of the solvent has been removed from the packing and the latter becomes granular in appearance, the mixing is discontinued and the packing is ready for extrusion. This may be effected in any suitable machine having a nozzle directed through the frame of a braiding machine whereby the core of plastic material forced from the nozzle is immediately enclosed in a braided jacket as it issues therefrom.

The presence of the graphite in the composition increases its lubricating qualities, reduces its friction and assists in its extrusion. Also, in combination with the grease, it aids in filling the interstices between the particles of cork and in flowing into the depressions in the cable or other member around which the packing is installed, to give a tight seal. For a non-conductor, the graphite may be replaced by mica, or some other inert lubricating filler such as talc, soapstone, fuller's earth, lead carbonate and the like.

The high melting point grease comprising one of the ingredients is a "fire kettle" dehydrated grease consisting essentially of a soda soap (principally sodium stearate) and high flash, straight mineral oil, having a melting point of about 350° F. or over. One form of a similar grease is commonly known to the trade as "Driving journal compound." This grease may be made by the saponification of tallow with soda lye and incorporating the oil therein according to the usual procedure well known in the art; or the tallow may be replaced in part by stearin, stearic acid, or another suitable fat which, when saponified, will yield essentially a stearate.

For certain applications the sodium stearate may be replaced, in part, with calcium stearate or zinc stearate. One effect of such modification is a smoother texture of the grease. For use in cable stuffing boxes and the like it is preferred to employ a grease having a soap content of 40% to 55% and preferably in excess of about 30%. Its consistency and properties may be further modified to meet particular conditions, by varying the amount of mineral oil added to the packing. A grease having the following analysis is suitable for use with the other ingredients listed in the formula first given herein:

|  | Percent |
|---|---|
| Soda soap (sodium stearate) | 44.14 |
| Zinc soap (zinc stearate) | 1.66 |
| Heavy mineral oil | 52.73 |
| Silica | 0.60 |
| Moisture and volatile matter | 0.88 |

After the plastic product is produced, as thus described, and enclosed in a jacket, preferably a fabric or other non-conducting material as shown in Fig. 1, it may be installed in a stuffing box such as shown in Fig. 7, which is typical of those used for cables passing through a compartment wall on a ship. The wall, as shown at 12, is usually made of steel. The insulated conductor or cable 13 passes through an opening in said wall. The stuffing box 14 is mounted in said opening having the usual screw threaded ferrules 15, 16, whereby the packing 17 therein may be compressed around the insulated conductors into the irregular surface of the insulating coverings. In the case of insulated conductors armored with braided steel wires, or other covering which is not solid, but is in effect porous, the packing is pressed down into the interstices in the covering or braided jacket and forms a positive lock, thus holding the cable firmly in place, in addition to rendering the otherwise porous covering impervious to air, gas and liquid and sealing against leakage through the wall or partition. The pressure is not great enough to injure the metal jackets of the cables or the vulcanized rubber covers thereof, or form a circumferential groove therein to any objectionable extent, which deformation or grooving is known as necking. Also, in the case of a non-metallic covering for the conductors there is to a certain extent a positive locking action. Thus when the conductors are bent up and down somewhat as shown in dotted lines in Fig. 7, due to vibration or to a bending of greater magnitude, the conductors are held so firmly that such bending does not break the seal.

The constituents of the packing are of such character that the temperatures encountered will not cause the ingredients to melt and run out. When the packing is compressed by tightening the ferrules, the mass is capable of changing its shape or extruding into the porous jacket as the particles slide over each other, due to the presence of the grease or lubrication, and at the same time said particles constitute suitable material to firmly interlock with the surface of the insulating and reinforcing material surrounding the conductors. The resiliency of the packing keeps the joint tight for years, without the necessity for tightening the gland. Although the pressure employed may be such as to destroy the braided jacket of the packing, this is of no importance as the main purpose of the jacket is to permit the granular packing material to be conveniently handled and installed.

In Figs. 3 and 4 I have shown a modified form of packing in which the graphite has been replaced by other ingredients of a metallic character and a part of the cork has also been replaced with metal. Such a packing is useful where the presence of graphite would be objectionable, as where contact with stainless steel might result in electrolytic action or pitting the same. One use for a packing in which the graphite has been replaced, is in connection with rotatable spindles of the sea door dogs previously referred to. A typical construction of this type is shown in Fig. 8, hereinafter described. A suitable formula for the packing is as follows:

| Granular lead alloy, through 20 mesh | 18 lbs. 2 oz. |
|---|---|
| Lead carbonate powder | 2 lbs. 12 oz. |
| 14–20 mesh shredded cork | 1 lb. 13 oz. |
| Ground mica | 4 lbs. 11 oz. |
| High melting point grease of a combined lime soap and mineralic soap | 4 lbs. 1 oz. |

In comparing this formula with the previous formulae it will be seen that the sodium stearate has been replaced in part by calcium stearate and also in part by a mineralic soap or ester, obtained from refining naphthenic sludge.

In this case also, where mica is called for, some other inert lubricating filler may be employed such as talc, soapstone, fuller's earth or lead carbonate. Also, the proportions may be varied. The high melting point grease may be similar to that previously described although it is preferable to replace the sodium stearate with other ingredients. Such a plastic composition is indicated at 18 in Fig. 4, being enclosed in a jacket 19 of braided fabric, although where the non-conducting property is not important, soft wire such as copper or lead may be used. Where the packing is used, however, in a sea door dog structure such as shown in Fig. 8, it is preferably furnished in stick form whereby it may be inserted within a threaded counterbore 20 and forced into a smaller passage 21 by means of a plunger 22 formed as a cylindrical extension on a larger screw threaded rod 23. The packing is thus advanced axially and then forced out through radial openings into the packing space surrounding the rotatable spindle 24. This spindle is turned by handles 25, 26, to press the bulkhead door 27 against the door frame 28, an intervening gasket 29 being provided, in a manner which is well understood. The structure just described is described more fully and is claimed in the copending application of Newell Brackett, Serial No. 734,476, filed July 10, 1934.

Instead of surrounding the packings by a braided jacket, the outer casing may be formed in various other ways. For example, in Fig. 5 the covering is in the form of a strip of tape 30 which may be made of linen, metal foil, screen gauze or similar fibrous or non-abrasive metal helically wrapped around a somewhat less plastic core than the one shown in Figs. 1 and 2.

Fig. 6 shows a further form of jacket such as a strip of cloth 31 folded around the core with its margins 32 parallel and stitched together.

Material other than cloth may be applied in the same manner and the core may be formed by a process other than extrusion. Where the packing is used for cable stuffing boxes, however, it is very plastic and the woven jacket is not sufficiently tight to confine the granular packing material, which not only oozes out of or forces its way through the braided covering but also disrupts the same, permitting the packing to be pressed down around the braided jacket and into the interstices thereof. Also, it is resilient due to the inclusion of cork, sawdust or other light, compressible cellulosic material.

The packing described herein is capable of meeting the exacting requirements heretofore explained as to tightness of joints, temperature and service and under test has withstood pressure and temperatures very much higher than those mentioned.

With whatever cable sheath is used, the plastic packing material changes its shape sufficiently to work its way into the irregularities in the outer surface of the cable, as previously stated. The cable itself contains sufficient insulation between the conductor or conductors and the outer jacket to make it immaterial whether the packing material used in the stuffing boxes is conducting or non-conducting, but to provide for cases where the requirements, out of an abundance of caution, are unnecessarily strict, the non-conducting packing material can be provided. Therefore, if through long vibration and many years continual use the outer protecting covering of the cables becomes worn and the packing material works its way somewhat farther into the cable than is ordinarily contemplated, such action would not affect the insulating properties of the joint as a whole. In other words, no short circuits would be possible.

Where the cork in the packing is replaced by metal, we are not limited to the use of lead alloys or compounds as in the preferred example given, but may use other soft, non-abrasive metal such, for example, as aluminum and in some cases copper. Also, when furnished in stick form, as for sea door dogs, the packing is not as soft as where used for cable stuffing boxes.

Where the packing is enclosed in a thin jacket, it is advantageous to cover the outside with a grease of the same general character as that within the packing except that it is preferably made more plastic by the addition of more mineral oil. This coating prevents access of air to the packing until such time as it has been installed in the stuffing box and aids in keeping the packing soft and pliable throughout its length of service.

The packings as described herein, while particularly adapted for cable stuffing boxes and sea door dogs, are suitable also for other classes of service.

This application is a continuation in part of our copending application 705,102, filed January 3, 1934.

We claim:

1. A packing comprising shredded cork and granulated cork, graphite and high melting point grease consisting essentially of a soda soap and high flash mineral oil, the ratio by weight of the cork ingredients to the combined graphite and grease ingredients being about one to three.

2. As an article of manufacture, a bulkhead packing comprising a flexible, easily ruptured, porous casing containing plastic material, comprising ingredients in the following proportions by weight: eleven pounds of a mixture of granulated cork and shredded cork; sixteen pounds of graphite; sixteen pounds of high melting point dehydrated grease; and two and a half pounds of mineral oil.

3. A packing comprising small particles of cork, amorphous graphite, high melting point dehydrated grease and heavy mineral oil, said graphite and grease being used in substantially equal quantities by weight and each being in excess by weight of any of the other ingredients, said grease containing a soap content in excess of thirty per cent.

4. A packing comprising small particles of cork, amorphous graphite, high melting point dehydrated grease and heavy mineral oil, said graphite and grease being used in substantially equal quantities by weight and each being in excess by weight of any of the other ingredients, said grease containing essentially a sodium stearate base and a high flash mineral oil.

5. A packing comprising small particles of compressible cellulosic material, graphite and high melting point grease consisting essentially of a soda soap and high flash mineral oil, the ratio by weight of said small particles of compressible cellulosic material, to the combined graphite and grease ingredients, being about one to three.

6. The method of making plastic packing which consists in mixing graphite and small particles of cork, with a sodium stearate base grease and a high flash mineral oil, thinned with a petroleum product solvent, and removing said solvent by heat.

EDGAR G. HOWLAND.
FRANK E. PAYNE.